(12) United States Patent
Chao et al.

(10) Patent No.: US 10,197,247 B2
(45) Date of Patent: Feb. 5, 2019

(54) PLANAR OLED LAMP MODULE

(71) Applicants: Ching-Yan Chao, Hsinchu (TW);
Feng-Wen Yen, Taipei (TW)

(72) Inventors: Ching-Yan Chao, Hsinchu (TW);
Feng-Wen Yen, Taipei (TW)

( * ) Notice: Subject to any disclaimer, the term of this patent is extended or adjusted under 35 U.S.C. 154(b) by 29 days.

(21) Appl. No.: 15/649,658

(22) Filed: Jul. 14, 2017

(65) Prior Publication Data
US 2018/0180259 A1   Jun. 28, 2018

(30) Foreign Application Priority Data

Dec. 26, 2016 (TW) .............................. 105143152 A

(51) Int. Cl.
| | |
|---|---|
| *F21V 15/01* | (2006.01) |
| *F21S 6/00* | (2006.01) |
| *F21V 19/00* | (2006.01) |
| *F21V 23/06* | (2006.01) |
| *F21V 3/00* | (2015.01) |
| *F21Y 115/15* | (2016.01) |
| *F21Y 105/00* | (2016.01) |

(52) U.S. Cl.
CPC .............. *F21V 15/01* (2013.01); *F21S 6/003* (2013.01); *F21V 19/003* (2013.01); *F21V 3/00* (2013.01); *F21V 23/06* (2013.01); *F21Y 2105/00* (2013.01); *F21Y 2115/15* (2016.08)

(58) Field of Classification Search
CPC ........ F21V 15/01; F21V 19/00; F21V 19/001;
F21V 19/0015; F21V 19/002; F21V 19/0025; F21V 23/06; F21Y 2105/00;
F21Y 2115/10; F21Y 2115/15
See application file for complete search history.

(56) References Cited

U.S. PATENT DOCUMENTS

| | | | |
|---|---|---|---|
| 9,062,836 B2 * | 6/2015 | Tran | F21S 2/005 |
| 9,328,905 B2 * | 5/2016 | Hong | F21V 15/01 |
| 2004/0160768 A1 | 8/2004 | Cok | |
| 2013/0076229 A1 * | 3/2013 | Anami | H01L 51/5246 |
| | | | 313/498 |
| 2016/0025274 A1 | 1/2016 | Bukkems et al. | |

FOREIGN PATENT DOCUMENTS

| | | |
|---|---|---|
| CN | 103415740 B | 11/2013 |
| TW | I524570 B | 3/2016 |
| TW | I539110 B | 6/2016 |

* cited by examiner

Primary Examiner — Thien M Le
Assistant Examiner — April Taylor

(57) ABSTRACT

The present invention discloses a planar OLED lamp module, containing a planar OLED lamp and a lamp module. The lamp module possesses both openable lid and elastic metal units. So, the planar OLED lamp can be removed or dismantled during production assembly and maintenance more easily and quickly, therefore the cost can be significantly down.

9 Claims, 9 Drawing Sheets

PLANAR OLED LAMP MODULE

BACKGROUND OF THE INVENTION

1. Field of the Invention

The present invention generally relates to an OLED lighting application, in particular to a planar OLED lamp module.

2. Description of the Related Art

Organic light-emitting diode (OLED) is composed of an organic material layer sandwiched in between two electrodes, which can emit light under proper voltage. As OLED is of high efficiency, light and thin, of low power consumption, of wide view angle, of high contrast, easy to manufacture and of short response time, OLED can be applicable to flat panel display and the lighting industry.

Compared with OLED, inorganic LED is a point light source, the light emitted by inorganic LED is very concentrative and may result in blue light hazard. On the contrary, OLED is a planar light source without generating high temperature, the light emitted by OLED is soft and will not result in glare; thus, OLED is very suitable to be applied to indoor illumination. Besides, OLED is of high flexibility, so is easy to be integrated with building materials to create more light application situations.

Currently, OLED is still in its start-up stage in the lighting industry, commercialized OLED products are still hard to be seen in the market. Among current available OLED lighting products and prior art, the OLED lamp is fixed on the power driving module, as disclosed by Taiwan Patent No. 1539110; or the OLED lamp is welded on the circuit board, as disclosed by Taiwan Patent No. 1524570. Regarding the above OLED lamp module products, the OLED lamp is fixed inside the lamp module, so it is very inconvenient to install or dismantle the OLED lamp during production assembly and maintenance.

Accordingly, the planar OLED lamp module in accordance with the present invention adopts the separable design with an elastic electrical connection mechanism; in this way, manufacturers will be able to more quickly assembly OLED lighting products; besides, consumers will be able to also purchase OLED lamps as replacement parts by lower price in the future, which is really a win-win situation.

SUMMARY OF THE INVENTION

Therefore, it is a primary objective of the present invention to provide a planar OLED lamp module, which adopts the separable design with an elastic electrical connection mechanism in order to simplify the assembly of the OLED lamp module and lower the cost.

To achieve the foregoing objective, the present invention provides a planar OLED lamp module; the planar OLED lamp module includes at least one planar OLED lamp and a lamp module. The planar OLED lamp includes an OLED substrate and an OLED cover plate connecting to one side of the OLED substrate; the side where the OLED substrate connects to the OLED cover plate is provided with an OLED electrode surface. The OLED electrode surface includes at least one conductive unit, and the conductive unit includes at least one exposed positive electrode and at least one exposed negative electrode. One side of the lamp module is provided with an accommodating portion, and the opening of the accommodating portion is provided with at least one openable lid. The accommodating portion is provided with at least one power connection unit capable of connecting to an external power source; and the power connection unit includes at least two elastic metal units; besides, the bottom of the accommodating portion includes at least one transparent zone. The planar OLED lamp can be inserted into the accommodating portion of the lamp module to electrically connect the exposed positive and negative electrodes of the planar OLED lamp to the elastic metal units therein respectively, whereby the light emitted by the planar OLED lamp can be transmitted out of the transparent zone.

In a preferred embodiment, one side of the lamp module includes at least one transparent zone; in order to match the light emitting structure of the planar OLED lamp module, the transparent zone may be disposed at the openable lid or the bottom of the accommodating portion.

In a preferred embodiment, the openable lid pivotally connects to the opening of the accommodating portion, and the pivotal joint allows the accommodating portion to be opened by rotating the openable lid.

In a preferred embodiment, the openable lid is provided with a groove structure corresponding to the periphery of the opening of the accommodating portion, and the groove structure allows the accommodating portion to be opened by horizontally moving the openable lid.

In a preferred embodiment, in response to the arrangement design of the metal electrodes of the planar OLED lamp, the lamp module includes at least two elastic metal units disposed therein, and the voltage supplied by the external power source connecting to the elastic metal units does not exceed 12 volts; besides, the elastic metal unit are disposed at the same side or at different sides.

In a preferred embodiment, the lamp module of the planar OLED lamp module can also be provided with two or more of the lamp modules, which can satisfy the requirements of larger planar OLED lamp modules and can be applied to various lighting products, such as desk lamp, table lamp, decoration lighting products and common lighting products, etc. Further, in response to different appearance designs, the front view of the frame of the light emitting surface of the lamp module is designed to be substantially square or rectangular in shape; however, it can also be designed to be elliptic or circular in shape so as to match different environment landscape designs.

According to the disclosure of Taiwan Patent No. 1539110, the OLED lamp is fixed on the power driving module; according to the disclosure of Taiwan Patent No. 1524570, the OLED lamp is welded on the circuit board, as shown in FIG. 1. For these OLED lamp module, it is necessary to dismantle the OLED lamp from the module and then weld a new OLED lamp on the module when the OLED lamp ages or malfunctions, which will waste very much time and require a lot of hard work, or the whole OLED lamp module should be replaced, so the maintenance cost may further include the power driving module or circuit, which incurs unnecessary cost to consumers and wastes a lot of environmental resources.

Accordingly, the present invention adopts the separable design which has electrical connecting function through elastic metal units in order to achieve the object that consumers can swiftly replace the OLED lamp by themselves. In this way, the time and cost of replacing the lamp can be considerably reduced, so consumers will be more willing to use the OLED lighting lamp and the competitiveness of the OLED lighting products can be increased, which completely satisfies the environment-friendly requirements and conforms to the trend of green energy-saving.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
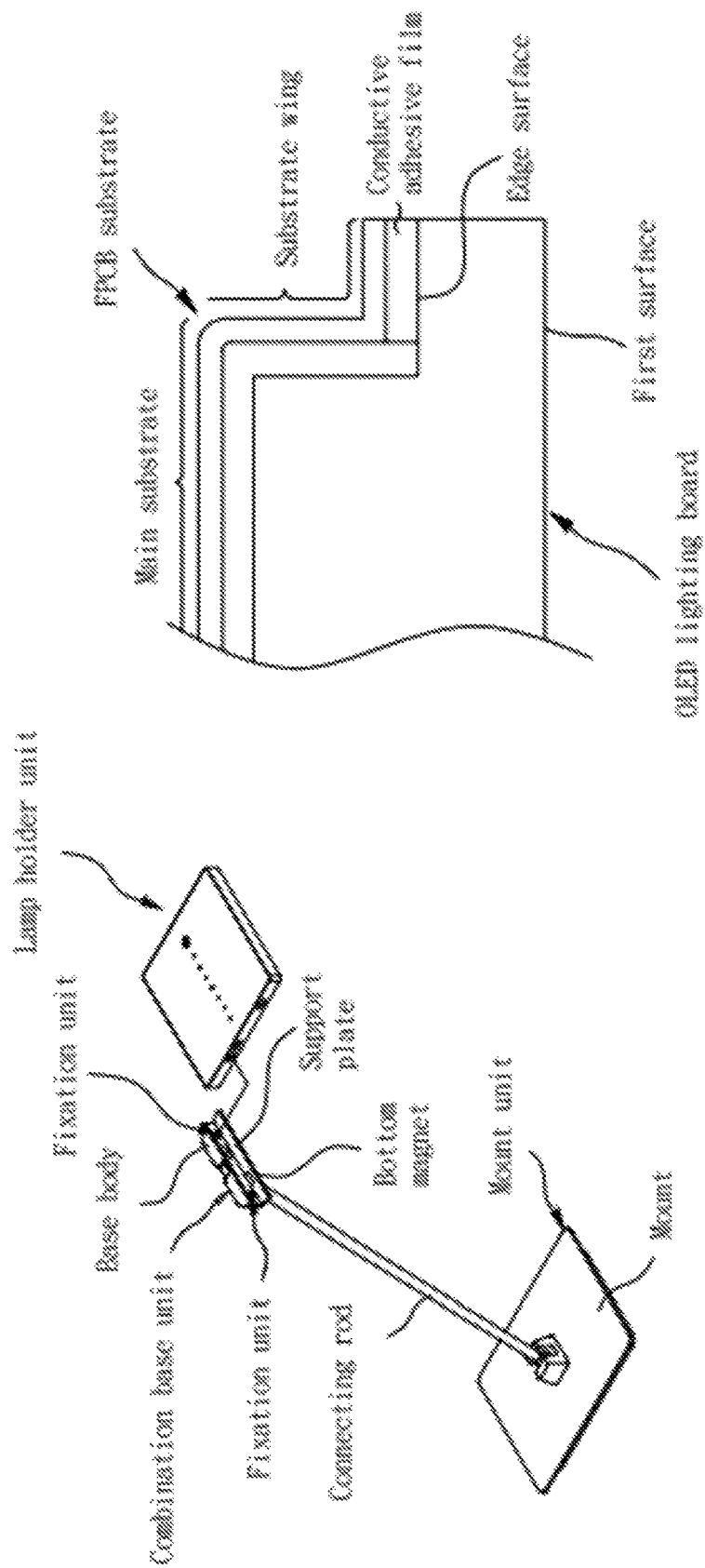
FIG. 1 is a schematic view of OLED lamp modules disclosed by the patent literatures cited by the present invention.
Figure 2:
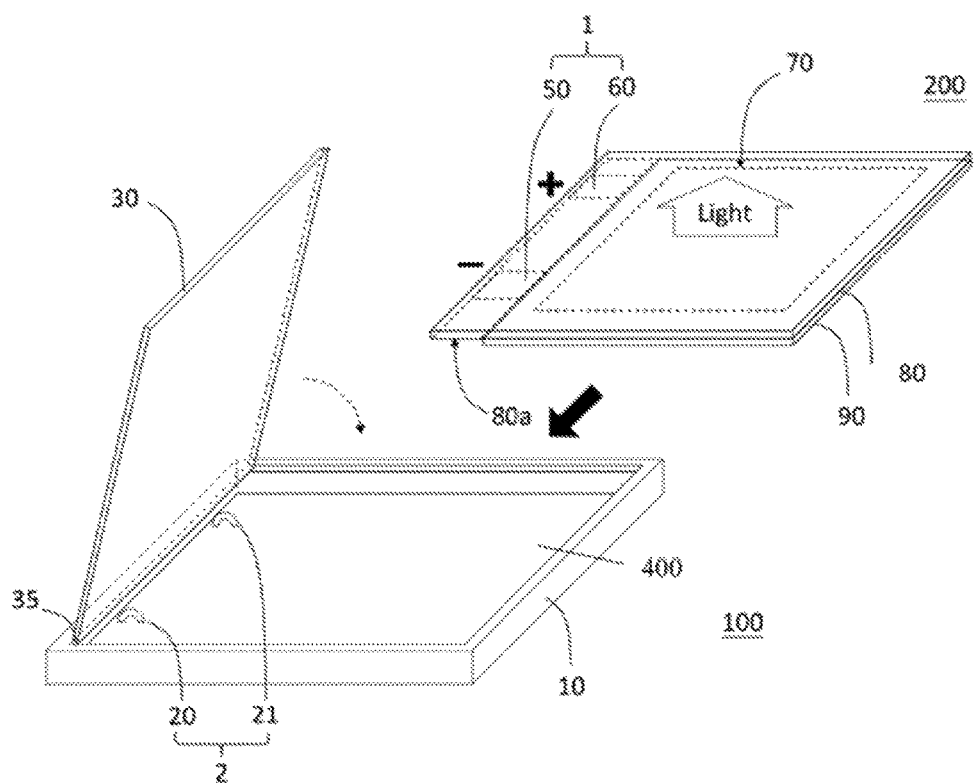
FIG. 2 is a schematic view of a first embodiment of an OLED lamp module in accordance with the present invention.

As shown in FIG. 2, a first embodiment of an OLED lamp module in accordance with the present invention, the planar OLED lamp module includes at least one planar OLED lamp 200 and a lamp module 100. The planar OLED lamp 200 includes an OLED substrate 80 and an OLED cover plate 90. The OLED substrate 80 includes a light emitting zone 70 and an OLED electrode surface 80a, and the OLED electrode surface 80a is between the OLED substrate 80 and the OLED cover plate 90. The OLED electrode surface 80a is provided with a conductive unit 1, and the conductive unit 1 includes at least one exposed positive electrode 60 and at least one exposed negative electrode 50. The planar OLED lamp 200 adopts the bottom-emission structure that the emitted light passes through the OLED substrate 80. The front view of the frame 10 of the light emitting surface of the lamp module 100 is designed to be substantially square or rectangular in shape; however, it can also be designed to be elliptic or circular in shape. The lamp module 100 includes an accommodating portion 400, an openable lid 30 and a power connection unit 2; the power connection unit 2 includes at least two elastic metal units 20, 21 capable of connecting to an external power source. The openable lid 30 pivotally connects to the opening of the accommodating portion 400; besides, the openable lid 30 is transparent and the pivotal joint at the opening of the accommodating portion 400 can serve as the lid rotation zone 35, whereby the accommodating portion 400 can be opened by rotating the openable lid 30. The planar OLED lamp 200 may be disposed inside the accommodating portion 400 to electrically connect the exposed positive electrode 60 and the exposed negative electrode 50 of the planar OLED lamp 200 to the elastic metal units 20, 21 respectively. In addition, after the openable lid 30 is closed, the light emitting zone 70 of the OLED substrate 80 will be corresponding to the transparent openable lid 30, whereby the light emitted by the planar OLED lamp 200 can be transmitted out of the openable lid 30.

In the embodiment, the lamp module 100 includes at least two elastic metal units 20, 21 disposed therein, and the elastic metal units 20, 21 are disposed at the same side of the planar OLED module 200. Further, the voltage supplied by the external power source connecting to elastic metal units 20, 21 does not exceed 12 volts.

Figure 3:
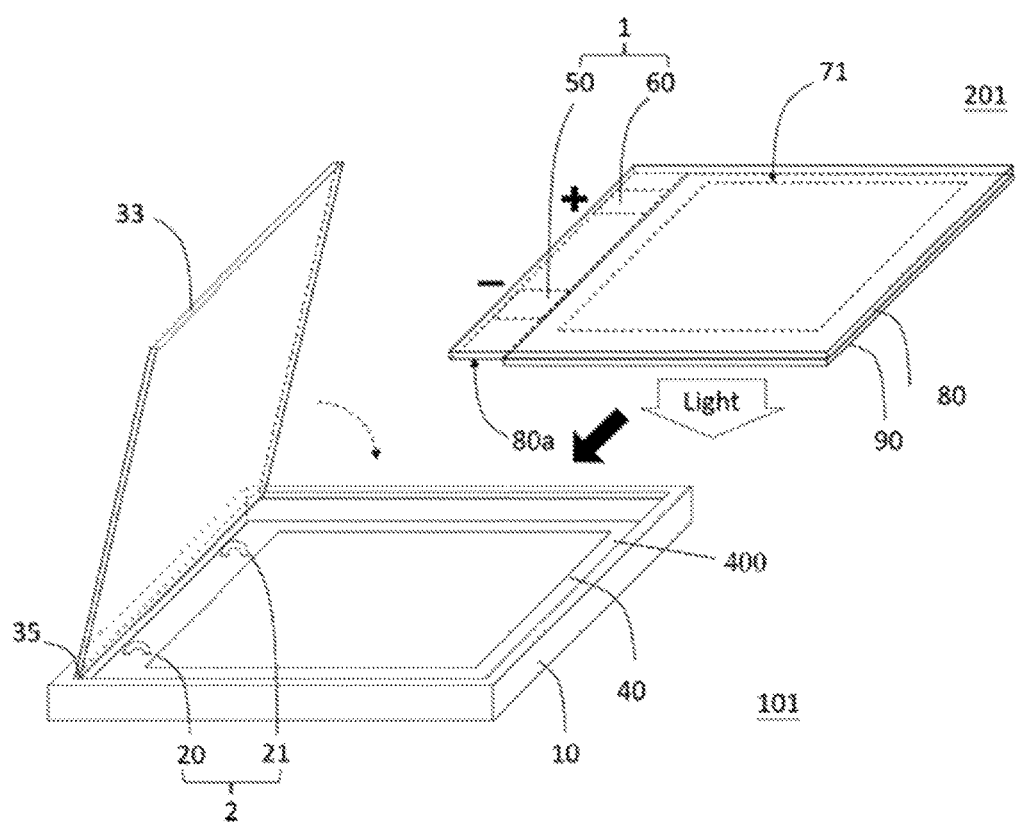
FIG. 3 is a schematic view of a second embodiment of an OLED lamp module in accordance with the present invention.

As shown in FIG. 3, a second embodiment of an OLED lamp module in accordance with the present invention, the planar OLED lamp module includes at least one planar OLED lamp 201 and a lamp module 101. The planar OLED lamp 201 includes an OLED substrate 80 and an OLED cover plate 90. The OLED substrate 80 includes a light emitting zone 71 and an OLED electrode surface 80a; and the OLED electrode surface 80a is between the OLED substrate 80 and the OLED cover plate 90; besides, the OLED electrode surface 80a is provided with at least one exposed positive electrode 60 and at least one exposed negative electrode 50. The planar OLED lamp 201 adopts the top-emission structure that the light emitted passes through the OLED cover plate 90. The front view of the frame 10 of the light emitting surface of the lamp module 101 is designed to be substantially square or rectangular in shape; however, it can also be designed to be elliptic or circular in shape. The lamp module 101 includes an accommodating portion 400, an openable lid 33 and at least two elastic metal units 20, 21 capable of connecting to an external power source. The largest side opposite to the openable lid 33 includes a transparent zone 40; the openable lid 33 pivotally connects to the opening of the accommodating portion 400, and the pivotal joint can serve as the lid rotation zone 35, so the accommodating portion 400 can be opened by rotating the openable lid 33. The planar OLED lamp 201 may be disposed inside the lamp module 101 to electrically connect the exposed positive electrode 60 and the exposed negative electrode 50 of the planar OLED lamp 200 to the elastic metal units 20, 21 respectively. In addition, after the openable lid 33 is closed, the light emitting zone 71 of the OLED substrate 80 will be corresponding to the transparent zone 40 of the largest side opposite to the openable lid 33, whereby the light emitted by the planar OLED lamp 201 can be transmitted out of the transparent zone 40.

In the embodiment, the lamp module the lamp module 101 includes at least two elastic metal units 20, 21 disposed therein, and the elastic metal units 20, 21 are disposed at the same side of the planar OLED module 201. Further, the voltage supplied by the external power source connecting to elastic metal units 20, 21 does not exceed 12 volts.

Figure 4:
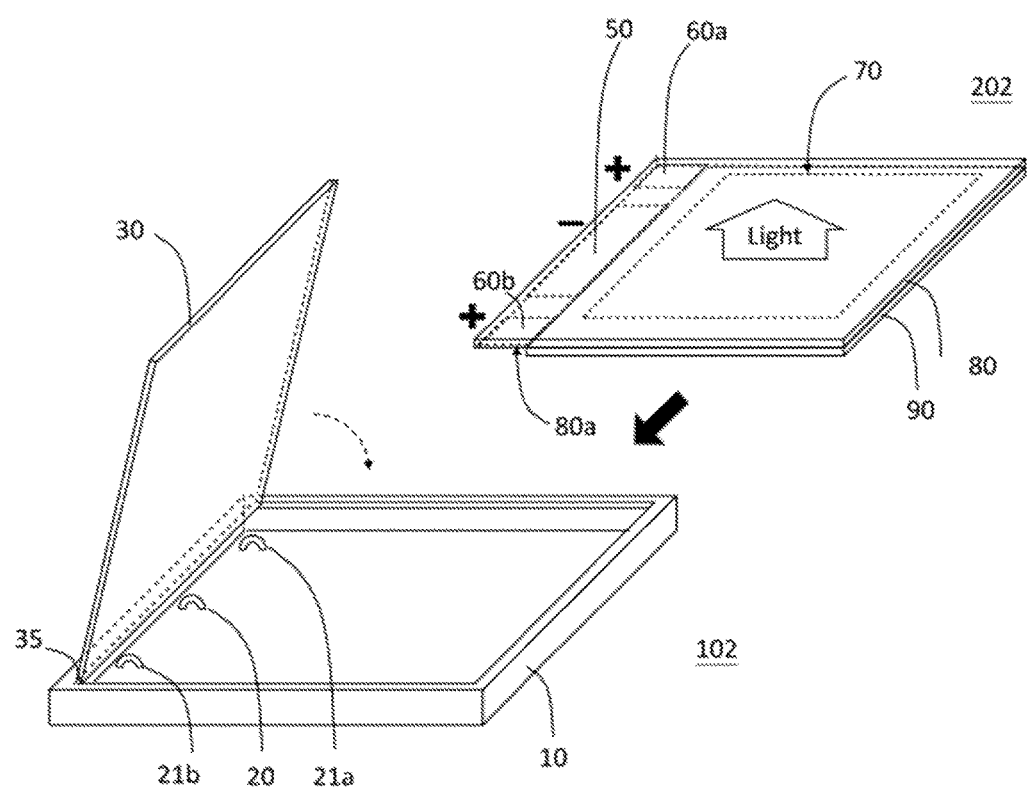
FIG. 4 is a schematic view of a third embodiment of an OLED lamp module in accordance with the present invention.

Moreover, as shown in FIG. 4, a third embodiment of an OLED lamp module in accordance with the present invention, as the positive electrodes of an OLED lamp usually have higher impedance, the IR drop thereof tends to increase; for the reason, the brightness of the lamp may not be uniform. However, if the positive electrodes 60a, 60b are respectively disposed at two sides of the negative electrode 50 of the planar OLED lamp 202 and the elastic metal units 21a, 21b are also respectively disposed at two sides of the elastic metal unit 20, the negative electrode 50 and the positive electrodes 60a, 60b can simultaneously supply the current for the planar OLED lamp 202; in this way, the brightness of the planar OLED lamp 202 can be more uniform.

Figure 5:
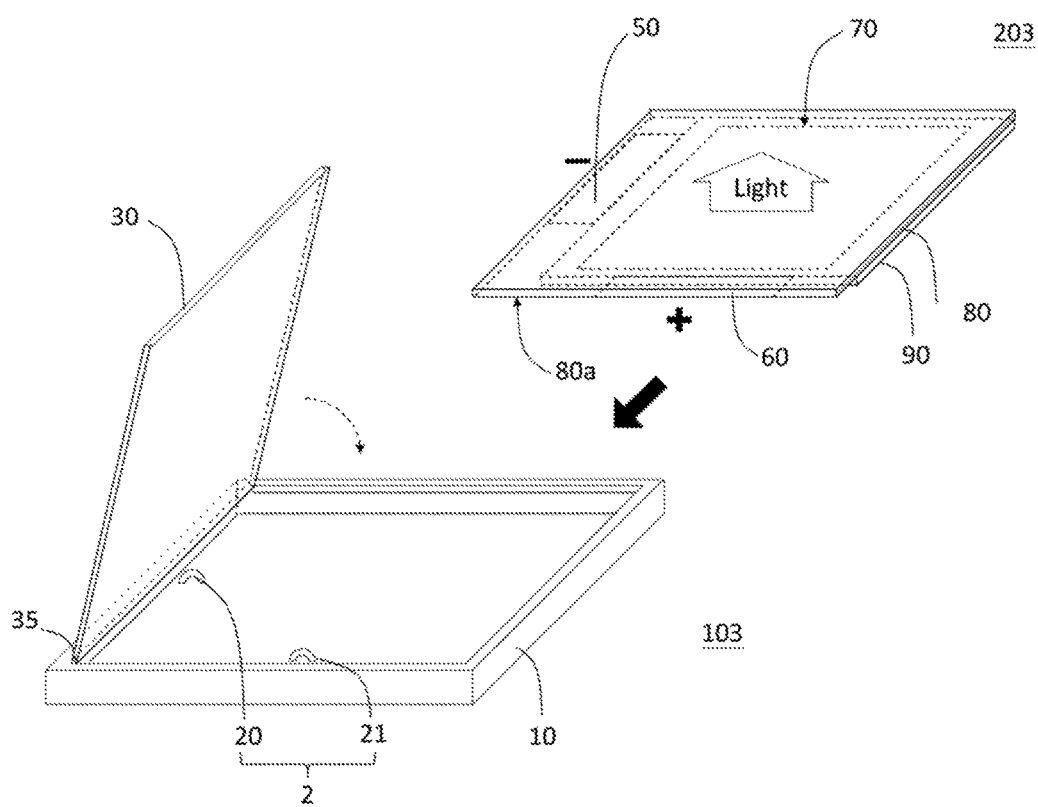
FIG. 5 is a schematic view of a fourth embodiment of an OLED lamp module in accordance with the present invention.

Furthermore, FIG. 5, a fourth embodiment of an OLED lamp module in accordance with the present invention, shows a different electrode arrangement design for the planar OLED lamp; in the embodiment, the positive electrode 60 and the negative electrode 50 of the planar OLED lamp 203 can be disposed at different sides; similarly, the elastic metal units 20, 21 of the lamp module 103 can also be disposed at different sides.

Figure 6:
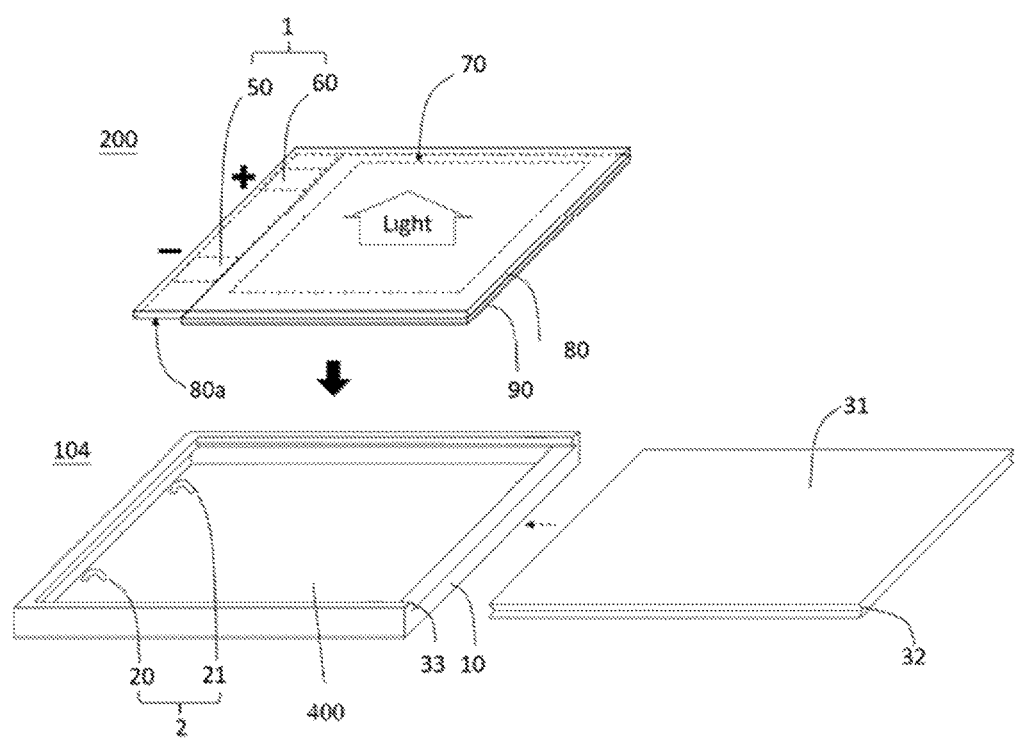
FIG. 6 is a schematic view of a fifth embodiment of an OLED lamp module in accordance with the present invention.

As shown in FIG. 6, a fifth embodiment of an OLED lamp module in accordance with the present invention, the planar OLED lamp module includes at least one planar OLED lamp 200 and a lamp module 104. The planar OLED lamp 200 includes an OLED substrate 80 and an OLED cover plate 90. The OLED substrate 80 includes a light emitting zone 70 and an OLED electrode surface 80a, and the OLED electrode surface 80a is between the OLED substrate 80 and the OLED cover plate 90. The OLED electrode surface 80a is provided with at least one exposed positive electrode 60 and at least one exposed negative electrode 50. The planar OLED lamp 200 adopts the bottom-emission structure that the light emitted passes through the OLED substrate 80. The front view of the frame 10 of the light emitting surface of the lamp module 104 is designed to be substantially square or rectangular in shape; however, it can also be designed to be elliptic or circular in shape. The lamp module 104 includes an accommodating portion 400, an openable lid 31 and at least two elastic metal units 20, 21 capable of connecting to an external power source. The openable lid 31 is transparent, and is provided with a groove structure corresponding to the periphery of the opening of the accommodating portion 400. The groove structure includes a lid groove 32 disposed at the openable lid 31 and a module groove 33 disposed at the opening of the accommodation portion 400. The openable lid 31 can be horizontally moved between the lid groove 32 and the module groove 33 to open or close the accommodating portion 400. The planar OLED lamp 200 may be disposed inside the lamp module 104 to electrically connect the exposed positive electrode 60 and the exposed negative electrode 50 of the planar OLED lamp 200 to the elastic metal units 20, 21 inside the lamp module 104 respectively. In addition, after the openable lid 31 is closed, the light emitting zone 70 of the OLED substrate 80 will be corresponding to the transparent openable lid 31, whereby the light emitted by the planar OLED lamp 200 can be transmitted out of the openable lid 31.

Figure 7:
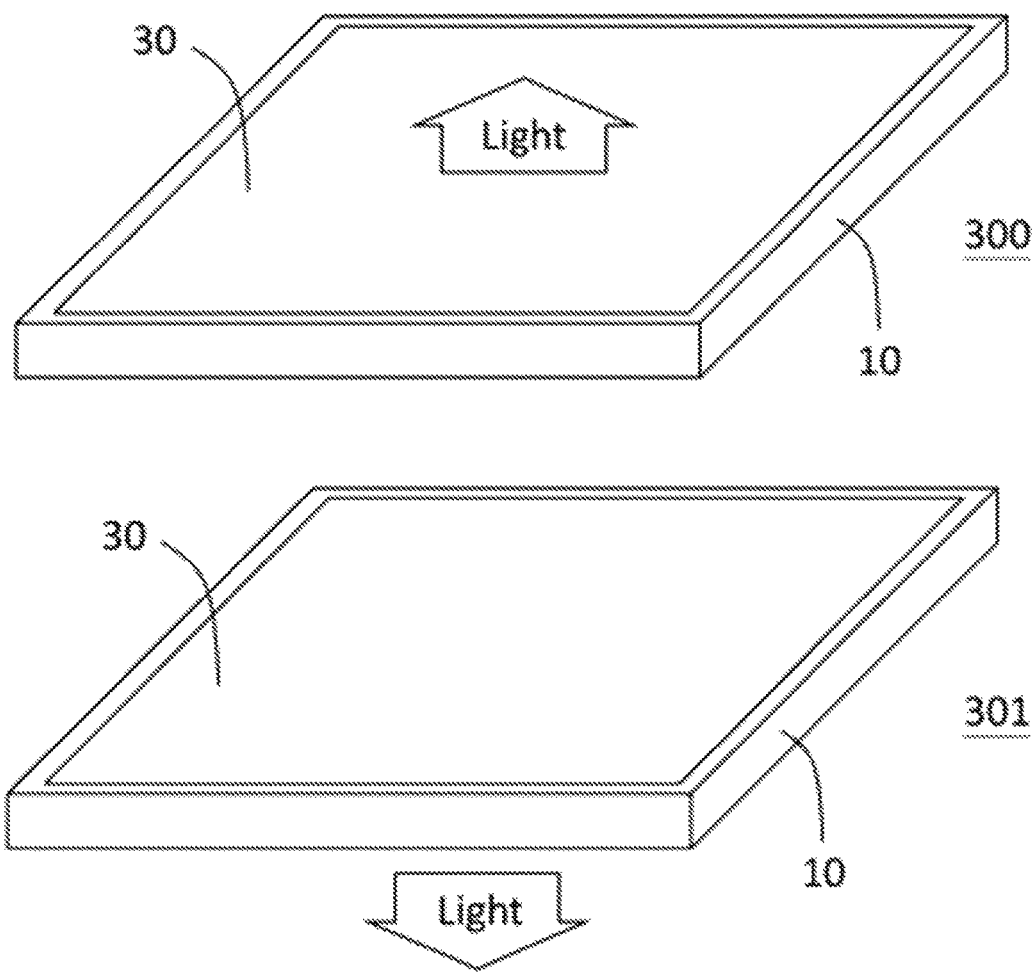
FIG. 7 is a schematic view of the assembled OLED lamp module of the first embodiment, the second embodiment, the third embodiment and the fourth embodiment in accordance with the present invention.

In the first embodiment, third embodiment and the fourth embodiment of the present invention, the planar OLED lamp adopts the bottom-emission OLED; therefore, after the openable lid 30 is closed, the light can be transmitted out of the openable lid 30, so a light and thin planar OLED lamp module 300 of simple structure and with a planar OLED lamp easily to replace is provided, as shown in FIG. 7. Further, in the second embodiment of the present invention, the planar OLED lamp adopts the top-emission OLED; therefore, after the openable lid 30 is closed, the light can be transmitted out of the transparent zone of the largest side opposite to the openable lid 30, so a light and thin planar OLED lamp module 301 of simple structure and with a planar OLED lamp easily to replace is provided, as shown in FIG. 7. In these embodiments, the front view of the frame 10 of the light emitting surface of the lamp module of the planar OLED lamp module is designed to be substantially square or rectangular in shape; however, it can also be designed to be elliptic or circular in shape so as to match different environment landscape designs.

Figure 8:
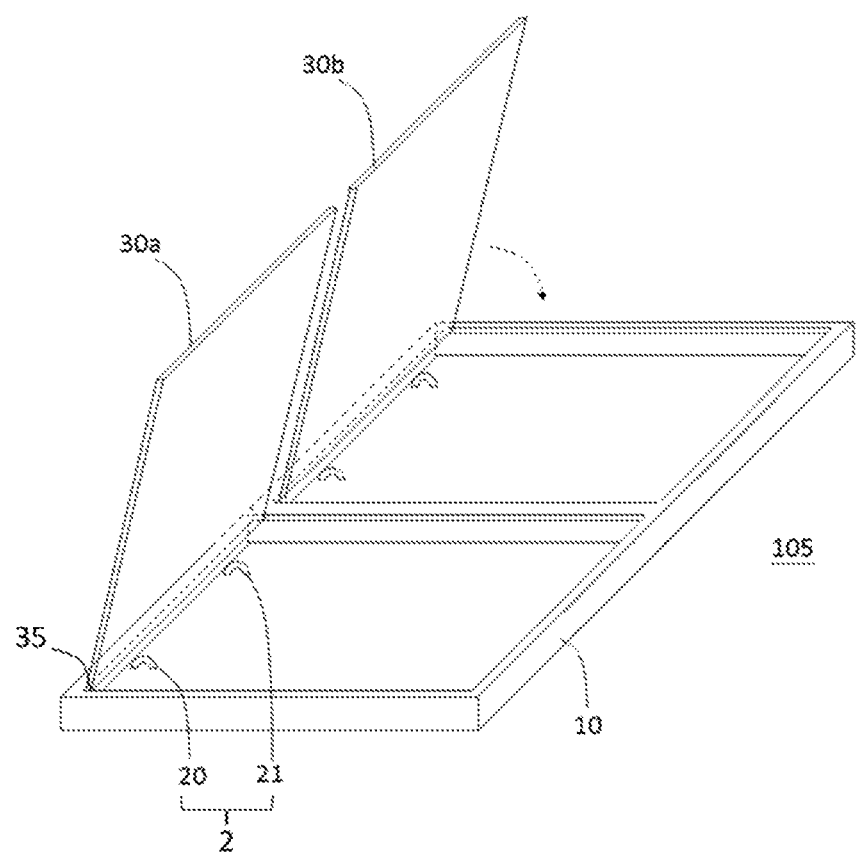
FIG. 8 is a schematic view of a sixth embodiment of an OLED lamp module in accordance with the present invention.
Figure 9:
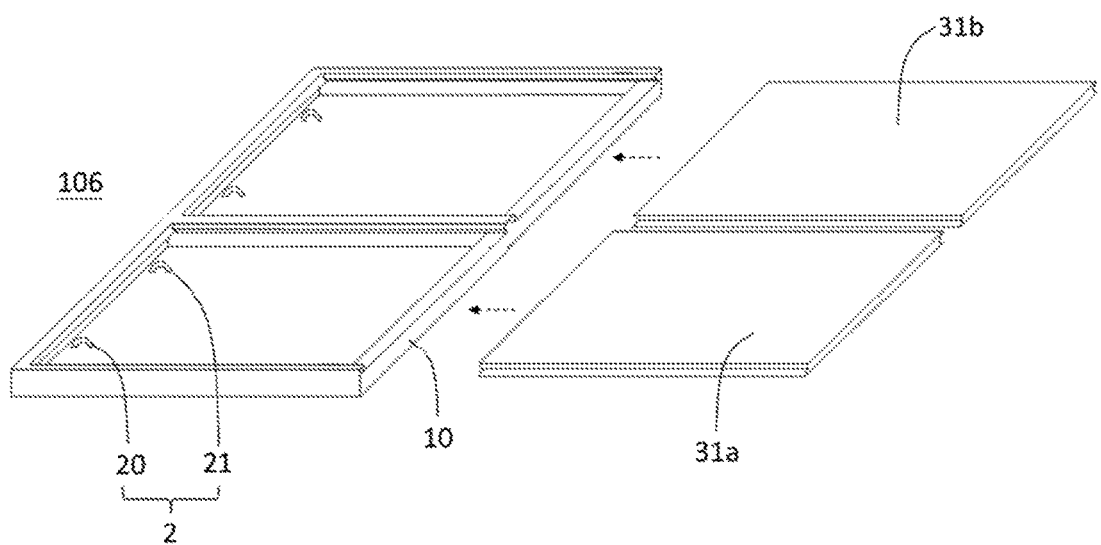
FIG. 9 is a schematic view of a seventh embodiment of an OLED lamp module in accordance with the present invention.

On the other hand, the planar OLED lamp module according to the present invention can also be provided with two or more of the slot openings for two or more planar OLED lamps to be inserted therein, which can satisfy the requirements of larger planar OLED lamp modules and can be applied to various lighting products, such as desk lamp, table lamp, decoration lighting products and common lighting products, etc. As shown in FIG. 8 and FIG. 9, each of the lamp module 105 and the lamp module 106 can be simultaneously installed with two planar OLED lamp modules (the planar OLED lamp modules are not shown in the drawings). After the openable lids 30a, 30b, 31a and 31b are closed, a planar OLED lamp module with larger light emitting area is provided. In addition, in response to different appearance designs, the front view of the frame 10 of the light emitting surface of the lamp module of the planar OLED lamp module is designed to be substantially square or rectangular in shape; however, it can also be designed to be elliptic or circular in shape so as to match different environment landscape designs.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A planar OLED lamp module, comprising:
    a lamp module, a side of the lamp module being provided with an accommodating portion, and an opening of the accommodating portion is provided with at least one openable lid, and the accommodating portion being provided with at least one power connection unit capable of connecting to an external power source; and
    at least one planar OLED lamp, disposed inside the accommodating portion of the lamp module, wherein the planar OLED lamp comprises an OLED substrate and an OLED cover plate connecting to a side of the OLED substrate; the side where the OLED substrate connects to the OLED cover plate is provided with an OLED electrode surface, and the OLED electrode surface comprises at least one conductive unit, and the conductive unit electrically connects to the power connection unit of the lamp module;
    wherein the openable lid pivotally connects to the opening of the accommodating portion, and the pivotal joint allows the accommodating portion to be opened by rotating the openable lid.

2. The planar OLED lamp module of claim 1, wherein the planar OLED lamp is a bottom-emission OLED, and the openable lid of the lamp module is transparent.

3. The planar OLED lamp module of claim 1, wherein the planar OLED lamp is a top-emission OLED, and a side opposite to a side where the openable lid of the lamp module is disposed is transparent.

4. The planar OLED lamp module of claim 1, wherein the conductive unit comprises a positive electrode and a negative electrode.

5. The planar OLED lamp module of claim 1, wherein the power connection unit comprises at least two elastic metal units disposed inside the accommodating portion, and the elastic metal units are disposed at the same side.

6. The planar OLED lamp module of claim 1, wherein the power connection unit comprises at least two elastic metal units disposed inside the accommodating portion, and the elastic metal units are disposed at different sides.

7. The planar OLED lamp module of claim 1, wherein a voltage supplied by the external power source connecting to the power connection unit does not exceed 12 volts.

8. The planar OLED lamp module of claim 1, wherein a bottom of the accommodating portion comprises at least one transparent zone.

9. The planar OLED lamp module of claim 1, wherein a front view of a frame of a light emitting surface of the lamp module is substantially square, rectangular, elliptic or circular in shape.

* * * * *